United States Patent
Lee et al.

(10) Patent No.: US 10,142,880 B2
(45) Date of Patent: Nov. 27, 2018

(54) METHOD AND APPARATUS FOR CONFIGURING SCHEDULING REQUEST PROHIBIT TIMER FOR PROSE PRIORITY IN WIRELESS COMMUNICATION SYSTEM

(71) Applicant: LG ELECTRONICS INC., Seoul (KR)

(72) Inventors: Youngdae Lee, Seoul (KR); Seungjune Yi, Seoul (KR); Sunghoon Jung, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/520,374

(22) PCT Filed: Dec. 2, 2015

(86) PCT No.: PCT/KR2015/013070
§ 371 (c)(1),
(2) Date: Apr. 19, 2017

(87) PCT Pub. No.: WO2016/089115
PCT Pub. Date: Jun. 9, 2016

(65) Prior Publication Data
US 2017/0325119 A1    Nov. 9, 2017

Related U.S. Application Data

(60) Provisional application No. 62/086,716, filed on Dec. 3, 2014.

(51) Int. Cl.
*H04L 29/06*  (2006.01)
*H04W 72/12*  (2009.01)
(Continued)

(52) U.S. Cl.
CPC ......... *H04W 28/0268* (2013.01); *H04L 69/28* (2013.01); *H04W 4/02* (2013.01); *H04W 4/70* (2018.02); *H04W 72/121* (2013.01)

(58) Field of Classification Search
CPC ............. H04W 72/04; H04W 72/0446; H04W 28/0278; H04W 72/02; H04W 72/042;
(Continued)

(56) References Cited

U.S. PATENT DOCUMENTS

2012/0100864 A1   4/2012  Susitaival et al.
2013/0235768 A1   9/2013  Earnshaw et al.
(Continued)

OTHER PUBLICATIONS

Ericsson, "Prohibit timer for SR", R2-145228, 3GPP TSG-WG2 Meeting #88, San Francisco, USA, Nov. 17-21, 2014.
(Continued)

*Primary Examiner* — Kwasi Karikari
(74) *Attorney, Agent, or Firm* — Dentons US LLP

(57) ABSTRACT

A method and apparatus for configuring a proximity-based services (ProSe) scheduling request (SR) prohibit timer in a wireless communication system is provided. A user equipment (UE) receives an indication of the ProSe SR prohibit timer from a network, and configures the ProSe SR prohibit timer according to the indication. Upon configuring the ProSe SR prohibit timer, the UE may start or stop the configured ProSe SR prohibit timer for a triggered ProSe BSR which may only correspond to a Regular ProSe BSR. If the ProSe BSR has been triggered and the ProSe SR prohibit timer is not running, the UE may trigger a SR.

12 Claims, 14 Drawing Sheets

(51) Int. Cl.
*H04W 28/02* (2009.01)
*H04W 4/02* (2018.01)
*H04W 4/70* (2018.01)

(58) Field of Classification Search
CPC ..... H04W 72/10; H04W 76/02; H04W 48/02; H04W 56/001; H04W 72/1278; H04W 74/006; H04W 74/0833; H04W 76/028; H04W 48/12
See application file for complete search history.

(56) References Cited

U.S. PATENT DOCUMENTS

2014/0295820 A1   10/2014  Kim et al.
2016/0157256 A1*  6/2016  Tseng ................ H04W 72/1284
                                                                                    370/329
2016/0374104 A1*  12/2016  Watfa ................ H04W 36/0011

OTHER PUBLICATIONS

Panasonic, "SR issues for D2D communication", R2-143298, 3GPP TSG RAN WG2 Meeting #87, Dresden, Germany, Aug. 18-22, 2014.

* cited by examiner

FIG. 11

| Group index$_1$ | LCG ID$_1$ | Buffer Size$_1$ | Oct 1 |
| Buffer Size$_1$ | Group index$_2$ | | Oct 2 |
| LCG ID$_2$ | Buffer Size$_2$ | | Oct 3 |

⋮

| Group index$_{N-1}$ | LCG ID$_{N-1}$ | Buffer Size$_{N-1}$ | Oct 1.5*N-2 |
| Buffer Size$_{N-1}$ | Group index$_N$ | | Oct 1.5*N-1 |
| LCG ID$_N$ | Buffer Size$_N$ | | Oct 1.5*N |

FIG. 12

| Group index$_1$ | LCG ID$_1$ | Buffer Size$_1$ | Oct 1 |
| Buffer Size$_1$ | Group index$_2$ || Oct 2 |
| LCG ID$_2$ | Buffer Size$_2$ || Oct 3 |

⋮

| Group index$_N$ | LCG ID$_N$ | Buffer Size$_N$ | | | | Oct 1.5*N−0.5 |
| Buffer Size$_N$ | R | R | R | R | Oct 1.5*N+0.5 |

METHOD AND APPARATUS FOR CONFIGURING SCHEDULING REQUEST PROHIBIT TIMER FOR PROSE PRIORITY IN WIRELESS COMMUNICATION SYSTEM

CROSS-REFERENCE TO RELATED APPLICATIONS

This application is a National Stage Application of International Application No. PCT/KR2015/013070, filed on Dec. 2, 2015, which claims the benefit of U.S. Provisional Application No. 62/086,716, filed on Dec. 3, 2014, all of which are hereby incorporated by reference in their entirety for all purposes as if fully set forth herein.

BACKGROUND OF THE INVENTION

Field of the Invention

The present invention relates to wireless communications, and more particularly, to a method and apparatus for configuring a scheduling request (SR) prohibit timer for a proximity-based services (ProSe) priority in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

A buffer status reporting (BSR) procedure is used to provide the serving evolved NodeB (eNB) with information about the amount of data available for transmission in the uplink (UL) buffers of the UE. As ProSe is introduced in 3GPP LTE rel-12, BSR for ProSe may be newly defined. Accordingly, various operations related to the BSR for ProSe should be newly defined.

SUMMARY OF THE INVENTION

The present invention provides a method and apparatus for configuring a scheduling request (SR) prohibit timer for a proximity-based services (ProSe) priority in a wireless communication system. The present invention provides a method and apparatus for configuring and enabling a ProSe SR prohibit timer for at least one ProSe group, for at least one ProSe group priority or for at least one specific quality of service (QoS) characteristic.

In an aspect, a method for configuring, by a user equipment (UE), a proximity-based services (ProSe) scheduling request (SR) prohibit timer in a wireless communication system is provided. The method includes receiving an indication of the ProSe SR prohibit timer from a network, and configuring the ProSe SR prohibit timer according to the indication.

In another aspect, a user equipment (UE) is provided. The UE includes a memory, a transceiver, and a processor coupled to the memory and the transceiver, and configured to control the transceiver to receive an indication of a proximity-based services (ProSe) scheduling request (SR) prohibit timer from a network, and configure the ProSe SR prohibit timer according to the indication.

A ProSe SR prohibit timer can be configured efficiently.

BRIEF DESCRIPTION OF THE DRAWINGS

FIG. 11 shows a ProSe BSR MAC CE for even N.

FIG. 12 shows a ProSe BSR MAC CE for odd N.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi- Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
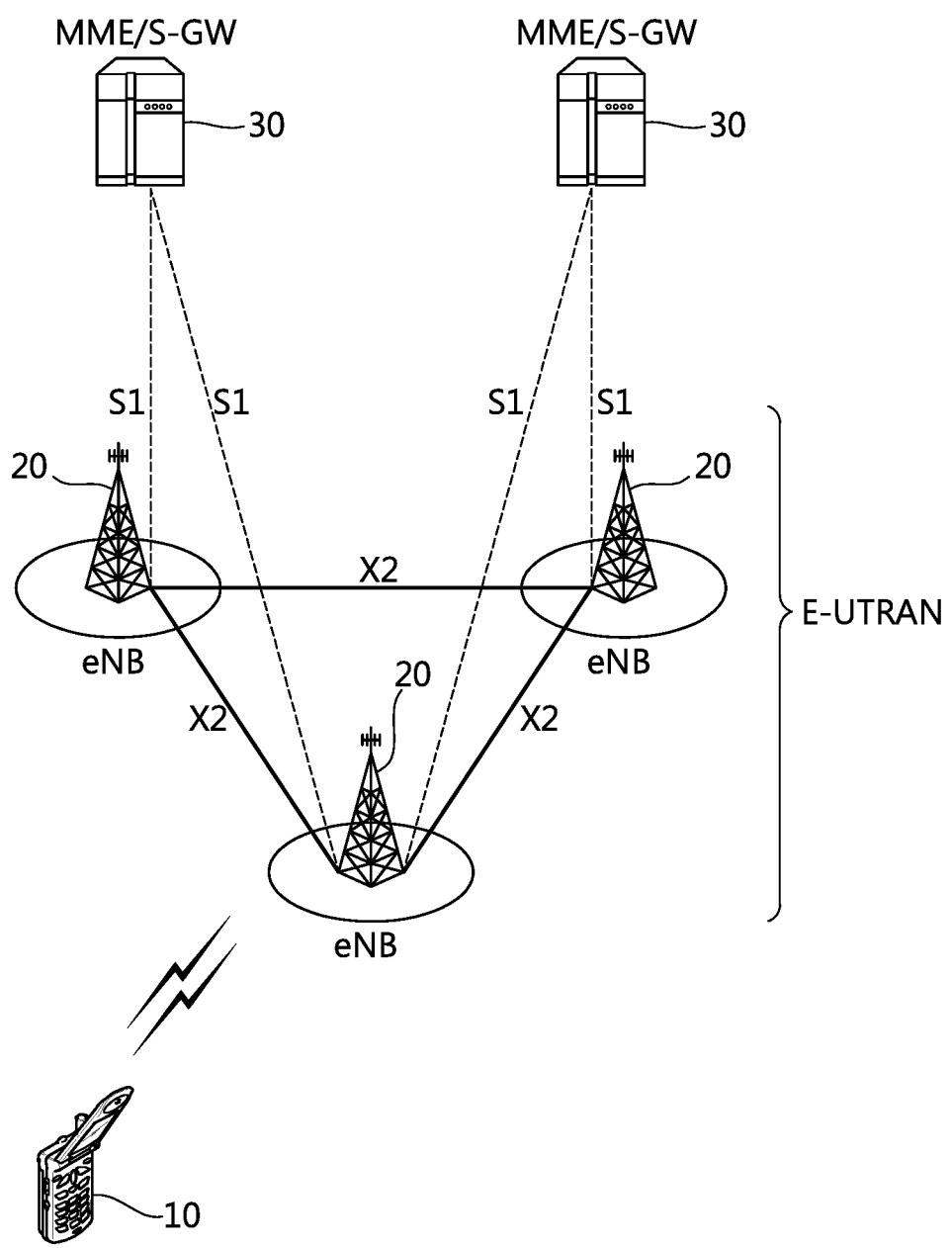
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
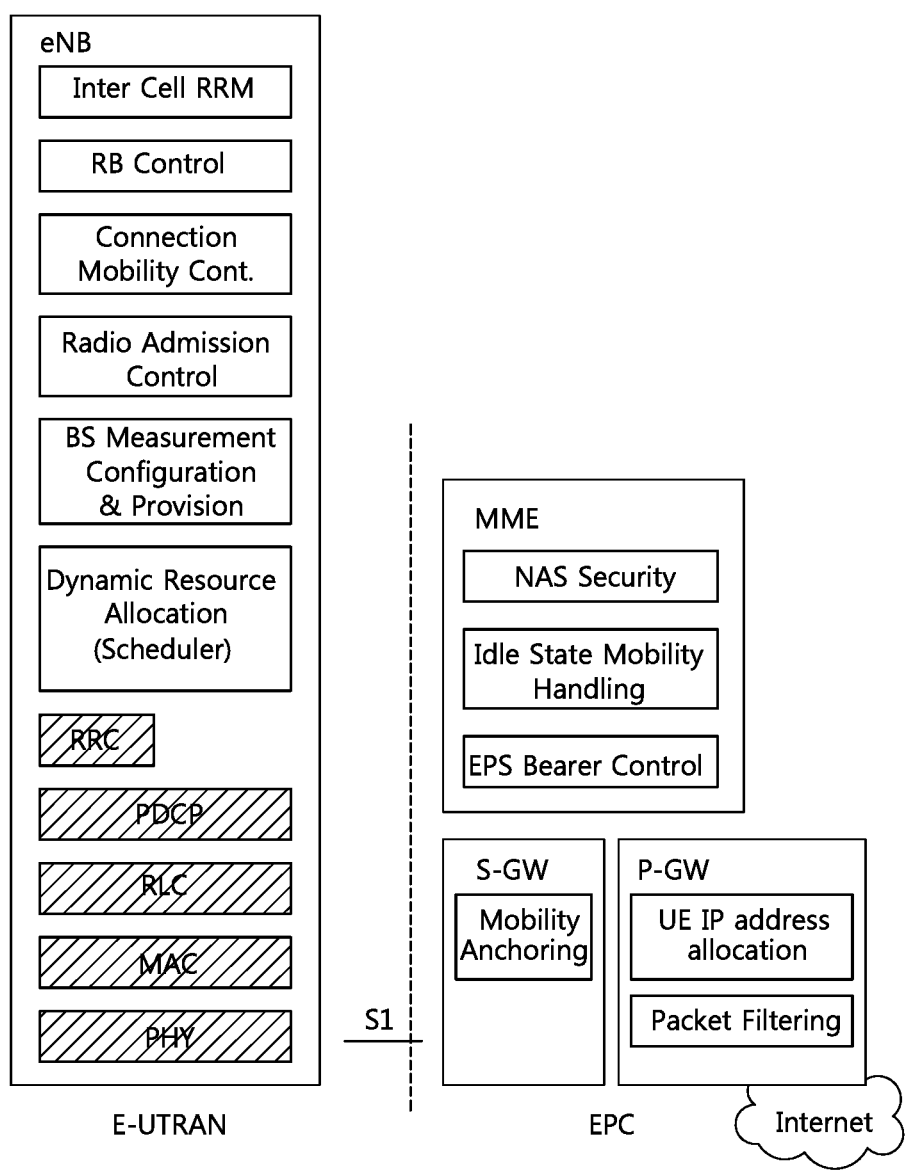
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
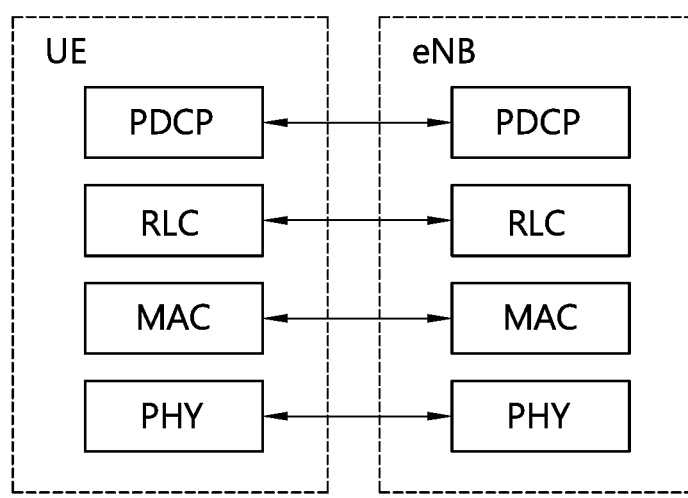
FIG. 3 shows a block diagram of a user plane protocol stack of an LTE system.
Figure 4:
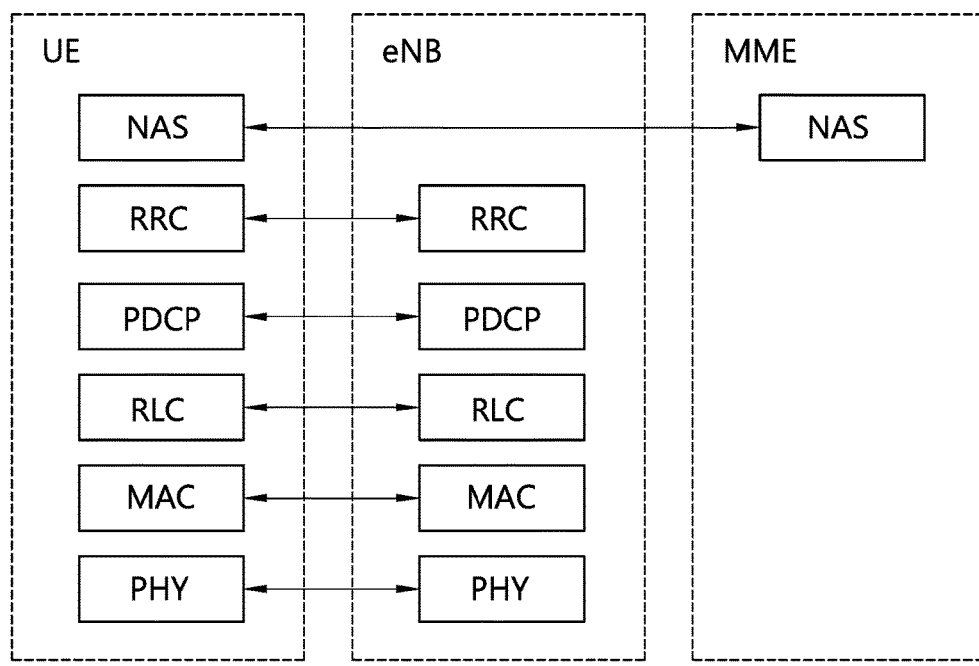
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel. Data between the MAC layer and the PHY layer is transferred through the transport channel Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
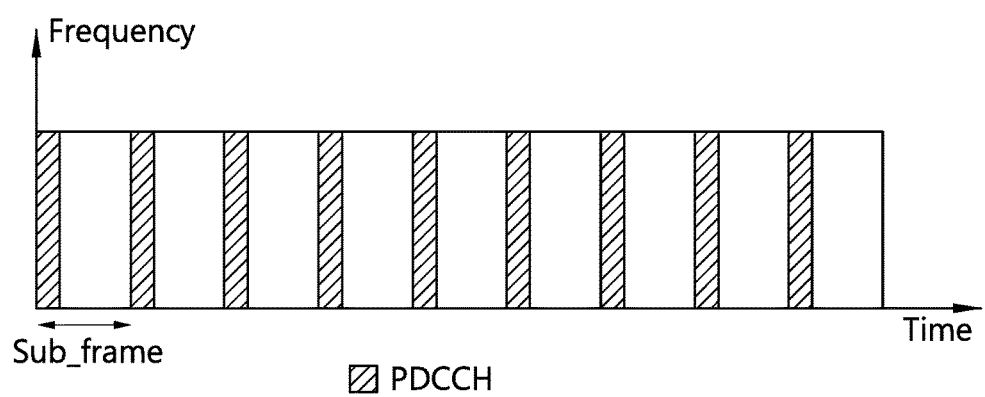
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Sidelink is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 6:
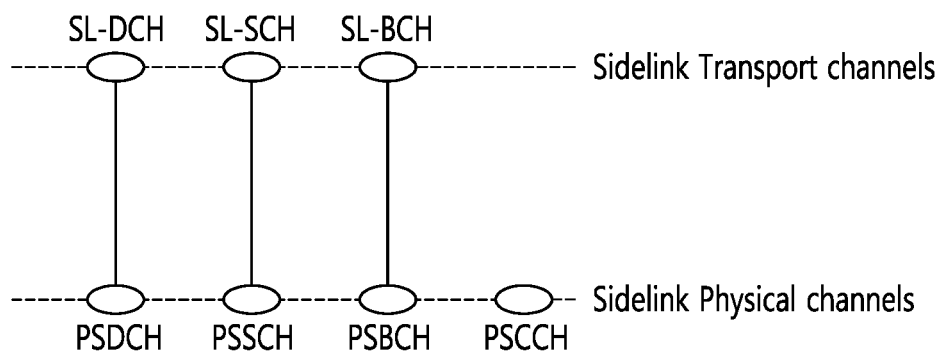
FIG. 6 shows mapping between sidelink transport channels and sidelink physical channels.

FIG. 6 shows mapping between sidelink transport channels and sidelink physical channels. Referring to FIG. 6, a sidelink discovery channel (SL-DCH) may be mapped to a physical sidelink discovery channel (PSDCH), which carries ProSe direct discovery message from the UE. The SL-DCH is characterized by:
 fixed size, pre-defined format periodic broadcast transmission;
 support for both UE autonomous resource selection and scheduled resource allocation by eNB;
 collision risk due to support of UE autonomous resource selection; no collision when UE is allocated dedicated resources by the eNB.

Further, a sidelink shared channel (SL-SCH) may be mapped to a physical sidelink shared channel (PSSCH), which carries data from a UE for ProSe direct communication. The SL-SCH is characterized by:
 support for broadcast transmission;
 support for both UE autonomous resource selection and scheduled resource allocation by eNB;
 collision risk due to support of UE autonomous resource selection; no collision when UE is allocated dedicated resources by the eNB;
 support for HARQ combining, but no support for HARQ feedback;
 support for dynamic link adaptation by varying the transmit power, modulation and coding.

Further, a sidelink broadcast channel (SL-BCH) may be mapped to a physical sidelink broadcast channel (PSBCH), which carries system and synchronization related information transmitted from the UE. The SL-BCH is characterized by pre-defined transport format.

A physical sidelink control channel (PSCCH) carries control from a UE for ProSe direct communication. The PSCCH is mapped to the sidelink control resources. The PSCCH indicates resource and other transmission parameters used by a UE for PSSCH.

Figure 7:
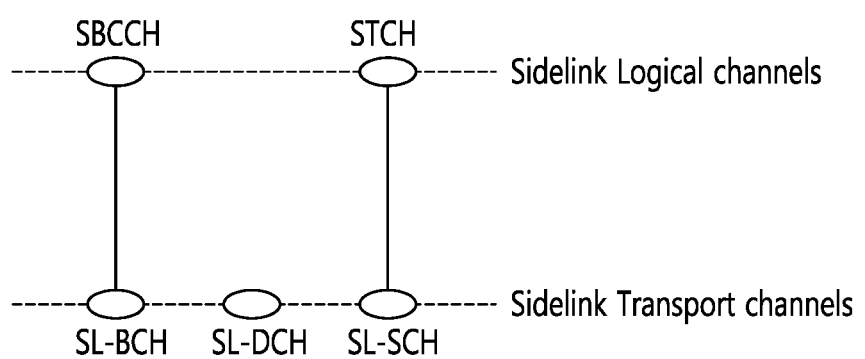
FIG. 7 shows mapping between sidelink logical channels and sidelink transport channels for ProSe direct communication.

FIG. 7 shows mapping between sidelink logical channels and sidelink transport channels for ProSe direct communication. Referring to FIG. 7, a sidelink broadcast control channel (SBCCH) may be mapped to the SL-BCH. The SBCCH is a sidelink channel for broadcasting sidelink system information from one UE to other UE(s). This channel is used only by ProSe direct communication capable UEs. Further, a sidelink traffic channel (STCH) may be mapped to the SL-SCH. The STCH is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

In order to perform synchronization, SBCCH carries the most essential system information needed to receive other ProSe channels and signals. SBCCH along with synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH. Otherwise, UE uses pre-configured parameters. There is only one subframe every 40 ms for synchronization signal and SBCCH transmission for in-coverage operation. System information block (SIB) 18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source.

UE performs Prose direct communication on subframes defined over the duration of sidelink control period. The sidelink control period is the period over which resources allocated in a cell for sidelink control and sidelink data transmissions occur. Within the sidelink control period, the UE sends a sidelink control followed by data. Sidelink control indicates a layer 1 ID and characteristics of the transmissions (e.g. MCS, location of the resource(s) over the duration of sidelink control period, timing alignment).

The UE performs transmission and reception of Uu and PC5 with the following decreasing priority order:
 Uu transmission/reception (highest priority)
 PC5 ProSe direct communication transmission/reception
 PC5 ProSe direct discovery transmission/reception (lowest priority)

Figure 8:
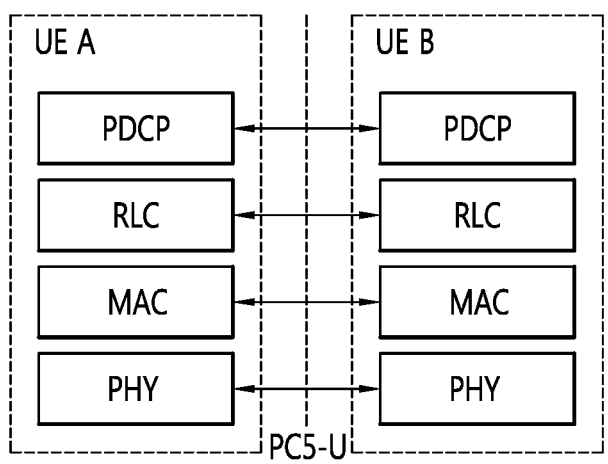
FIG. 8 shows a user plane protocol stack for ProSe direct communication.

FIG. 8 shows a user plane protocol stack for ProSe direct communication. Referring to FIG. 8, PDCP, RLC and MAC sublayers (terminate at the other UE) perform the functions listed for the user plane. The PC5-U interface consists of PDCP, RLC, MAC and PHY.

There is no HARQ feedback for ProSe direct communication. MAC sub header contains LCIDs to differentiate multiple logical channels. RLC unacknowledged mode (UM) is used for ProSe direct communication. Segmentation and reassembly of RLC service data units (SDUs) are performed. A receiving UE needs to maintain at least one RLC UM entity per transmitting peer UE. A receiving RLC UM entity used for ProSe direct communication does not need to be configured prior to reception of the first RLC unacknowledged mode data (UMD) protocol data unit (PDU). Robust header compression (ROHC) unidirectional mode is used for header compression in PDCP for ProSe direct communication.

A UE may establish multiple logical channels. Logical channel ID (LCID) included within the MAC subheader uniquely identifies a logical channel within the scope of one source Layer-2 ID and ProSe layer-2 group ID combination. Parameters for logical channel prioritization are not configured.

Figure 9:
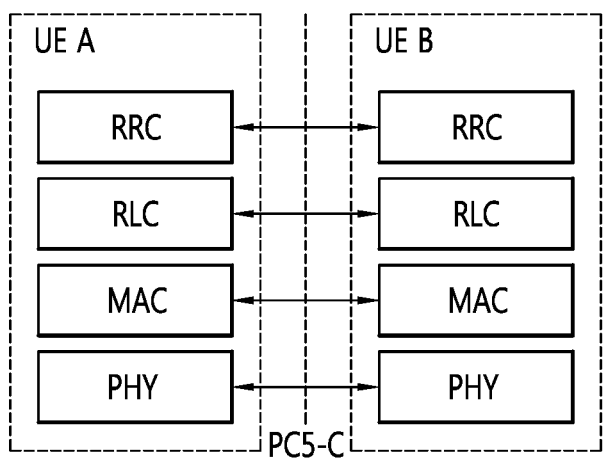
FIG. 9 shows a control plane protocol stack for ProSe direct communication.

FIG. 9 shows a control plane protocol stack for ProSe direct communication. Referring to FIG. 9, PDCP, the AS protocol stack for SBCCH in the PC5-C interface consists of RRC, RLC, MAC and PHY. a UE does not establish and maintain a logical connection to receiving UEs prior to a ProSe direct communication. In order to perform synchronization, UE(s) may transmit synchronization signal and SBCCH and become synchronization source.

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe BSR. Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools to transmit sidelink control and data.

UE in RRC_CONNECTED may send the ProSe direct indication to eNB when UE becomes interested in ProSe direct communication. In response, eNB may configure the UE with a SL-RNTI.

A UE is considered in-coverage for ProSe direct communication whenever it detects a cell on a public safety ProSe carrier. If the UE is out of coverage, it can only use Mode 2. If the UE is in coverage, it may use Mode 1 or Mode 2. If the UE is in coverage, it shall use only Mode 1 unless one of the exceptional cases occurs. When an exceptional case occurs, the UE is allowed to use Mode 2 temporarily even though it was configured to use Mode 1. Resource pool to be used during exceptional case may be provided by eNB.

A UE that is camped or connected on one carrier frequency but interested in ProSe direct communication operation on another carrier frequency (i.e. public safety ProSe carrier) shall attempt to find cells on the public safety ProSe carrier. An RRC_IDLE UE camped on a cell in another carrier frequency, but in the coverage area of an E-UTRA cell on public safety ProSe carrier, may consider the public safety ProSe carrier to be highest priority, and reselects to the cell on the public safety ProSe carrier. UE may consider a frequency (non-public safety ProSe carrier) to be highest priority if it can perform ProSe direct communication only while camping on the frequency.

An RRC_CONNECTED UE served by a cell in another carrier frequency may send a ProSe direct communication indication to its serving cell when it wants to perform ProSe direct communication. The indication contains the intended public safety ProSe carrier. The serving cell indicates with the presence of SIB 18 whether the UE is allowed to send the ProSe direct communication indication. The serving cell may configure an inter-frequency radio resource management (RRM) measurement on the public safety ProSe carrier. Once the UE enters coverage of a cell on the public safety ProSe carrier, based on measurement report, the eNB performs inter-frequency mobility to the public safety ProSe carrier. If inter-frequency mobility is not performed by the serving cell, or if it fails, the UE may still perform ProSe direct communication using Mode 2 from the resource pools, if any, broadcasted by the detected E-UTRA cell on the public safety ProSe carrier.

If the UE does not detect an E-UTRA cell on the public safety ProSe carrier, the UE can use public safety ProSe carrier resources preconfigured in the universal integrated circuit card (UICC) or mobile equipment (ME) for out of coverage ProSe direct communication. If the UE detects an E-UTRA cell on the public safety ProSe carrier, the UE stops using resources preconfigured in the UICC or ME. UE may use Mode 2 from the resource pools, if any, broadcasted by the detected E-UTRA cell on the public safety ProSe carrier. For Rel-12, all ProSe communication (for a UE) is performed on a single preconfigured public safety ProSe carrier Frequency, which is valid in the operating region. Higher layers check validity of the public safety ProSe carrier Frequency in the operating region.

The cell on the public safety ProSe carrier may provide a transmission resource pool for Mode 2 in SIB 18. UEs that are authorized for Prose direct communication may use these resources for ProSe direct communication in RRC_IDLE in the cell in the same carrier (i.e. public safety ProSe carrier). UEs that are authorized for Prose direct communication may use these resources for ProSe direct communication in RRC_IDLE or RRC_CONNECTED in a cell in another carrier.

Alternatively, the cell on the public safety ProSe carrier may indicate in SIB 18 that it supports ProSe direct communication but does not provide transmission resources. UEs need to enter RRC_CONNECTED to perform ProSe direct communication transmission. In this case, the cell on the public safety ProSe carrier may provide, in broadcast signaling, a fallback transmission resource pool for Mode 2, to be used by the UE in case of failure to establish a RRC connection. A UE in RRC_CONNECTED that is authorized to perform ProSe direct communication transmission indicates to the serving eNB that it wants to perform ProSe direct communication transmissions. The eNB validates whether the UE is authorized for ProSe direct communication transmission using the UE context received from MME. The eNB may configure a UE by dedicated signalling with a transmission resource pool for Mode 2. That may be used without constraints while the UE is RRC_CONNECTED. Alternatively, the eNB may configure a UE with a transmission resource pool for Mode 2 which the UE is allowed to use only in exceptional cases, and rely on Mode 1 otherwise.

The resource pools for sidelink control when the UE is out of coverage are pre-configured for reception and transmission. The resource pools for sidelink control when the UE is in coverage are configured as below. The resource pool used for reception is configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling, if Mode 1 is used. The eNB schedules the specific resource(s) for sidelink control transmission within the configured reception pool. In order to perform communication even when some UEs are in-coverage and some UEs are out of coverage, all UEs (i.e. both in and out of coverage) should be configured with resource pools for sidelink control which is the union of the resource pools used for transmission of sidelink control in neighbor cells and transmission of sidelink control resource pool out of coverage.

The resource pools for data when the UE is out of coverage are pre-configured for reception and transmission. The resource pools for data when the UE is in coverage are configured by the eNB via RRC, in dedicated or broadcast signaling, if Mode 2 is used, for reception and transmission. There is no resource pool for transmission if Mode 1 is used.

ProSe direct discovery is defined as the procedure used by the UE supporting direct discovery to discover other UE(s) in its proximity, using E-UTRA direct radio signals via PC5. ProSe direct discovery is supported only when the UE is served by E-UTRAN.

Figure 10:
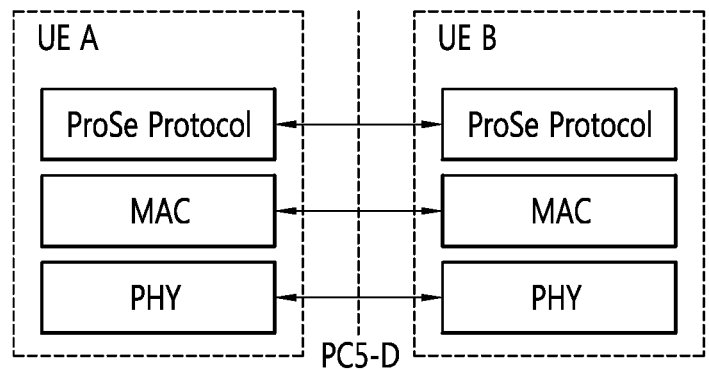
FIG. 10 shows PC5 interface for ProSe direct discovery.

FIG. 10 shows PC5 interface for ProSe direct discovery. Referring to FIG. 10, UE A and UE B perform ProSe direct discovery using ProSe protocol via PC5-D. Upper layer handles authorization for announcement and monitoring of discovery message. Content of discovery message is transparent to AS and no distinction in AS is made for ProSe direct discovery models and types of ProSe direct discovery. The ProSe protocol ensures that only valid discovery messages are delivered to AS for announcement. The UE can participate in announcing and monitoring of discovery message in both RRC_IDLE and RRC_CONNECTED states as per eNB configuration. The UE announces and monitors its discovery message subject to the half-duplex constraint. The UE that participates in announcing and monitoring of discovery messages maintains the current coordinated universal time (UTC) time. The UE that participates in announcing transmits the discovery message which is generated by the ProSe protocol taking into account the UTC time upon transmission of the discovery message. In the monitoring UE, the ProSe protocol provides the message to be verified together with the UTC time upon reception of the message to the ProSe function.

There are three range classes. Upper layer authorization provides applicable range class of the UE. Maximum allowed transmission power for each range class is signaled in SIB 19. UE uses the applicable maximum allowed transmission power corresponding to its authorized range class. This puts an upper limit on the determined transmit power based on open loop power control parameters.

Radio protocol stack (AS) for ProSe direct discovery consists of only MAC and PHY. The AS layer performs interfaces with upper layer (ProSe Protocol). The MAC layer receives the discovery message from the upper layer (ProSe Protocol). The IP layer is not used for transmitting the discovery message. The AS layer also performs scheduling. The MAC layer determines the radio resource to be used for announcing the discovery message received from upper layer. The AS layer also performs discovery PDU generation. The MAC layer builds the MAC PDU carrying the discovery message and sends the MAC PDU to the physical layer for transmission in the determined radio resource. No MAC header is added.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via RRC. The eNB assigns resource(s) via RRC. The resources are allocated within the resource pool that is configured in UEs for monitoring.

For UEs in RRC_IDLE, the eNB may provide a resource pool for Type 1 based discovery message announcement in SIB 19. UEs that are authorized for Prose direct discovery use these resources for announcing discovery message in RRC_IDLE. Alternatively, the eNB may indicate in SIB 19 that it supports ProSe direct discovery but does not provide resources for discovery message announcement. UEs need to enter RRC_CONNECTED in order to request resources for discovery message announcement.

For UEs in RRC_CONNECTED, a UE authorized to perform ProSe direct discovery announcement indicates to the eNB that it wants to perform ProSe direct discovery announcement. The eNB validates whether the UE is authorized for ProSe direct discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The dedicated resources allocated by the eNB are valid until the eNB re-configures the resource(s) by RRC signaling, or the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring in SIB 19. The SIB 19 may contain detailed ProSe direct discovery configuration used for announcing in neighbor cells of intra-frequency as well.

Synchronous and asynchronous deployments are supported. Discovery resources can be overlapping or non-overlapping across cells.

A UE, if authorized by the network, can announce discovery message only on serving cell. The UE can monitor discovery resources in the same as well as other frequencies than the serving cell, in same or different PLMNs. The serving cell may provide in SIB 19 a list of frequencies along with PLMN ID on which the UE may aim to monitor discovery message. The serving cell does not provide detailed ProSe discovery configuration for other carrier frequencies. The UE shall read SIB 19 and other relevant SIBs on other carriers if it wants to perform discovery message monitoring on those carriers. Obtaining ProSe direct discovery configuration by reading SIB 19 (and other SIBs) of an inter-frequency and/or inter-PLMN cell shall not affect the UE's Uu reception on the serving cell(s);

Intra-frequency, inter-frequency and inter-PLMN ProSe direct discovery monitoring shall not affect Uu reception. Intra-frequency ProSe direct discovery announcing shall not affect Uu transmission. The UE uses DRX occasions in RRC_IDLE and RRC_CONNECTED or second RX chain if it is available, for intra-frequency, inter-frequency and inter-PLMN discovery message monitoring. The UE uses DRX occasions in RRC_IDLE and RRC_CONNECTED for intra-frequency ProSe direct discovery announcement. The UE shall not create autonomous gaps. RACH preamble and message 3 transmission are prioritized over discovery message monitoring/announcement. Message 2 and message 4 reception are prioritized over discovery monitoring/announcement, if UE does not have additional RX chain for discovery monitoring. An RRC_CONNECTED UE sends ProSe discovery indication to the serving cell if it is interested or no longer interested in intra-frequency, inter-frequency or inter-PLMN discovery message monitoring.

For PC5 interface, source ID, destination ID may be in front of the MAC PDU without MAC subheader. One D2D group may be composed of UEs supporting different MAC PDU formats. A MAC PDU format version number may be included in the first field of D2D MAC PDU. Separate HARQ entity for D2D may be configured. For Uu interface, the UE may belong to multiple groups. It may be beneficial for the network to know which buffer status information is mapped to which D2D communication groups of a UE. Group index may be informed to the eNB by BSR (either explicitly or implicitly). The eNB may be aware of group ID, and mapping relation between group ID and group index. The UE may report group ID, and mapping relation between group ID and group index to the eNB.

The sidelink buffer status reporting (BSR) (or ProSe BSR) procedure is used to provide the serving eNB with information about the amount of sidelink data available for transmission in the SL buffers of the UE. RRC controls sidelink BSR reporting by configuring the two timers Periodic-ProseBSR-Timer and RetxProseBSR-Timer. Each sidelink logical channel is allocated to an logical channel group (LCG) with LCG identifier (LCGID) set to "11" and belongs to a ProSe destination.

A sidelink BSR shall be triggered if any of the following events occur:
1>if the UE has a configured SL-RNTI:
2>SL data, for a sidelink logical channel of a ProSe destination, becomes available for transmission in the RLC entity or in the PDCP entity and there is currently no data available for transmission for any of the sidelink logical channels belonging to the same ProSe destination, in which case the ProSe BSR is referred below to as "Regular ProSe BSR";
2>UL resources are allocated and number of padding bits remaining after a potential Padding BSR has been triggered is equal to or larger than the size of the ProSe BSR MAC control element (CE) containing the buffer status for at least one ProSe destination plus its subheader, in which case the ProSe BSR is referred below to as "Padding ProSe BSR";
2>RetxProseBSR-Timer expires and the UE has data available for transmission for any of the sidelink logical channels, in which case the ProSe BSR is referred below to as "Regular ProSe BSR";
2>Periodic-ProseBSR-Timer expires, in which case the ProSe BSR is referred below to as "Periodic ProSe BSR";
1>else:
2>An SL-RNTI is configured by upper layers and SL data is available for transmission in the RLC entity or in the PDCP entity, in which case the ProSe BSR is referred below to as "Regular ProSe BSR".

For Regular and Periodic ProSe BSR:
1>if the number of bits in the UL grant is greater than the size of a ProSe BSR containing buffer status for all ProSe destinations having data available for transmission:
2>report ProSe BSR containing buffer status for all ProSe destinations having data available for transmission;
1>else report Truncated ProSe BSR containing buffer status for as many ProSe destinations having data available for transmission as possible, taking the number of bits in the UL grant into consideration.

For Padding ProSe BSR:
1>if the number of padding bits remaining after a potential Padding BSR has been triggered is greater than the size of a ProSe BSR containing buffer status for all ProSe destinations having data available for transmission:
2>report ProSe BSR containing buffer status for all ProSe destinations having data available for transmission;
1>else report Truncated ProSe BSR containing buffer status for as many ProSe destinations having data available for transmission as possible, taking the number of bits in the UL grant into consideration.

If the BSR procedure determines that at least one ProSe BSR has been triggered and not cancelled:
1>if the UE has UL resources allocated for new transmission for this TTI:
2>instruct the multiplexing and assembly procedure to generate the ProSe BSR MAC CE(s);
2>start or restart Periodic-ProseBSR-Timer except when all the generated ProSe BSRs are Truncated ProSe BSRs;
2>start or restart RetxProseBSR-Timer.
1>else if a Regular ProSe BSR has been triggered:
2>if an UL grant is not configured:
3>a scheduling request (SR) shall be triggered.

A MAC PDU shall contain at most one ProSe BSR MAC CE, even when multiple events trigger a ProSe BSR by the time a ProSe BSR can be transmitted in which case the Regular ProSe BSR and the Periodic ProSe BSR shall have precedence over the padding ProSe BSR.

The UE shall restart RetxProseBSR-Timer upon reception of an SL grant.

All triggered ProSe BSRs shall be cancelled in case the remaining SL grant(s) valid for this SC period can accommodate all pending data available for transmission. All triggered ProSe BSRs shall be cancelled when a ProSe BSR (except for Truncated ProSe BSR) is included in a MAC PDU for transmission. All triggered ProSe BSRs shall be cancelled, and RetxProSeBSR-Timer and PeriodicProSeBSRTimer shall be stopped, when upper layers configure autonomous resource selection.

The UE shall transmit at most one Regular/Periodic ProSe BSR in a TTI. If the UE is requested to transmit multiple MAC PDUs in a TTI, it may include a padding ProSe BSR in any of the MAC PDUs which do not contain a Regular/Periodic ProSe BSR.

All ProSe BSRs transmitted in a TTI always reflect the buffer status after all MAC PDUs have been built for this TTI. Each ProSe destination shall report at the most one buffer status value per TTI and this value shall be reported in all ProSe BSRs reporting buffer status for this ProSe Destination.

A Padding ProSe BSR is not allowed to cancel a triggered Regular/Periodic ProSe BSR. A Padding ProSe BSR is triggered for a specific MAC PDU only and the trigger is cancelled when this MAC PDU has been built.

ProSe (BSR) MAC CE consists of ProSe BSR and ProSe Truncated BSR, which consist of one group index field, one LCG ID field and one corresponding buffer size field per reported target group. The ProSe BSR is identified by MAC PDU subheaders with LCID. It has a variable size.

FIG. 11 shows a ProSe BSR MAC CE for even N. FIG. 12 shows a ProSe BSR MAC CE for odd N. For each included group, the fields are defined as follow:
  Group index: The group index field identifies the ProSe destination group. The length of this field is 4 bits. The value is set to the index of the destination identity reported in ProseDestinationInfoList;
  LCG ID: The LCG ID field identifies the group of logical channel(s) which buffer status is being reported. The length of the field is 2 bits and it is set to "11";
  Buffer size: The buffer size field identifies the total amount of data available across all logical channels of a ProSe destiantion after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. The values taken by the Buffer Size field are shown in Table 1 below;
R: Reserved bit, set to '0'.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

In some situations, SR transmission for ProSe needs to be prohibited. Meanwhile, as described above, for sidelink BSR (or, ProSe BSR), two timers, i.e. Periodic-ProseBSR-Timer and RetxProseBSR-Timer, are configured. Accordingly, a method for prohibiting SR transmission for ProSE by using an additional timer may be propsed accroding to an embodiment of the present invention.

Figure 13:
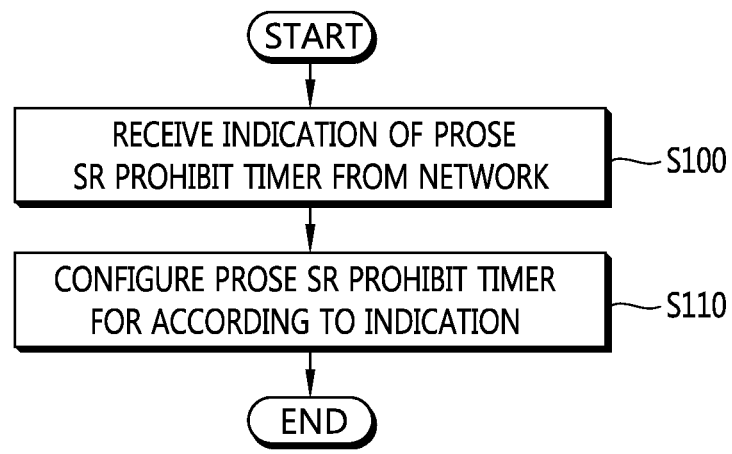
FIG. 13 shows a method for configuring a ProSe SR prohibit timer according to an embodiment of the present invention.

FIG. 13 shows a method for configuring a ProSe SR prohibit timer according to an embodiment of the present invention. In step S100, the UE receives an indication of the ProSe SR prohibit timer from a network. In step S110, the UE configures the ProSe SR prohibit timer according to the indication.

The UE may configure the ProSe SR prohibit timer for at least one ProSe group priority, for at least one specific QoS characteristic (e.g. at least one QoS class identifier (QCI) values), for at least one ProSe group, or for at least one ProSe per-packet priority (PPP). The indication of the ProSe SR prohibit timer may include at least one of a ProSe group priority list, a QoS characteristic list (e.g. QCI value list), a ProSe group list, or a ProSe PPP list. If the ProSe SR prohibit timer value is configured for the ProSe group priority, the ProSe SR prohibit timer may be applied to all ProSe groups with the same ProSe group priority. Or, if the ProSe SR prohibit timer value is configured for the specific QoS characteristic, e.g. a specific QCI value, the ProSe SR prohibit timer may be applied to all sidelink (logical) channels with the same QoS characteristic, e.g. the same QCI value. The ProSe group may be the ProSe destination group addressed by group index, destination layer 2 ID, or ProSe layer-2 group ID, indicated by the indication of the ProSe SR prohibit timer received from the network.

The ProSe SR prohibit timer may be applied to logical channels on sidelink, such as a SBCCH and a STCH. Further, the ProSe SR prohibit timer may be configured via system information or dedicated signaling by the network. The network may provide different ProSe SR prohibit timer values for different ProSe group priorities or for different QoS characteristics of the same ProSe group. Alternatively, the ProSe SR prohibit timer value may be configured autonomously by the UE with a pre-configured value. Further, the ProSe SR prohibit timer may be configured for each type of sidelink channel For example, separate ProSe SR prohibit timers may be configured and enabled for SBCCH and STCH.

Upon configuring the ProSe SR prohibit timer, the UE may start or stop the configured ProSe SR prohibit timer for a triggered ProSe BSR which may only correspond to a Regular ProSe BSR. If the ProSe BSR is triggered only due to data becoming available for transmission for a ProSe group priority or a QoS characteristic for which the ProSe SR prohibit timer is enabled, the UE may start the ProSe SR prohibit timer, if not running Else, the UE may stop the ProSe SR prohibit timer, if configured and running If a ProSe BSR has been triggered and the ProSe SR prohibit timer is not running, and if an UL grant is not configured, a scheduling request may be triggered by the UE. The UE may perform physical uplink control channel (PUCCH) transmission or random access procedure to send the triggered scheduling request.

According to an embodiment of the present invention, the ProSe BSR procedure may be performed as follows. The sidelink BSR (or ProSe BSR) procedure is used to provide the serving eNB with information about the amount of sidelink data available for transmission in the SL buffers of the UE. RRC controls sidelink BSR reporting by configuring the three timers Periodic-ProseBSR-Timer, RetxProseBSR-Timer, and ProSeSRProhibit-Timer. Each sidelink logical channel is allocated to an logical channel group (LCG) with LCG identifier (LCGID) set to "11" and belongs to a ProSe destination.

A sidelink BSR shall be triggered if any of the following events occur:

1>if the UE has a configured SL-RNTI:
2>SL data, for a sidelink logical channel of a ProSe destination, becomes available for transmission in the RLC entity or in the PDCP entity and there is currently no data available for transmission for any of the sidelink logical channels belonging to the same ProSe destination, in which case the ProSe BSR is referred below to as "Regular ProSe BSR";
2>UL resources are allocated and number of padding bits remaining after a potential Padding BSR has been triggered is equal to or larger than the size of the ProSe BSR MAC control element (CE) containing the buffer status for at least one ProSe destination plus its subheader, in which case the ProSe BSR is referred below to as "Padding ProSe BSR";
2>RetxProseBSR-Timer expires and the UE has data available for transmission for any of the sidelink logical channels, in which case the ProSe BSR is referred below to as "Regular ProSe BSR";
2>Periodic-ProseBSR-Timer expires, in which case the ProSe BSR is referred below to as "Periodic ProSe BSR";
1>else:
2>An SL-RNTI is configured by upper layers and SL data is available for transmission in the RLC entity or in the PDCP entity, in which case the ProSe BSR is referred below to as "Regular ProSe BSR".

For Regular ProSe BSR:
1>if the ProSe BSR is triggered only due to data becoming available for transmission for a ProSe group priority (or a ProSe group or a QCI value) for which ProSeSRProhibit-Timer is enabled by upper layers:
2>if not running, start the ProSeSRProhibit-Timer;
1>else:
2>if configured and running, stop the ProSeSRProhibit-Timer.

For Regular and Periodic ProSe BSR:
1>if the number of bits in the UL grant is greater than the size of a ProSe BSR containing buffer status for all ProSe destinations having data available for transmission:
2>report ProSe BSR containing buffer status for all ProSe destinations having data available for transmission;
1>else report Truncated ProSe BSR containing buffer status for as many ProSe destinations having data available for transmission as possible, taking the number of bits in the UL grant into consideration.

For Padding ProSe BSR:
1>if the number of padding bits remaining after a potential Padding BSR has been triggered is greater than the size of a ProSe BSR containing buffer status for all ProSe destinations having data available for transmission:
2>report ProSe BSR containing buffer status for all ProSe destinations having data available for transmission;
1>else report Truncated ProSe BSR containing buffer status for as many ProSe destinations having data available for transmission as possible, taking the number of bits in the UL grant into consideration.

If the BSR procedure determines that at least one ProSe BSR has been triggered and not cancelled:
1>if the UE has UL resources allocated for new transmission for this TTI:
2>instruct the multiplexing and assembly procedure to generate the ProSe BSR MAC CE(s);
2>start or restart Periodic-ProseBSR-Timer except when all the generated ProSe BSRs are Truncated ProSe BSRs;
2>start or restart RetxProseBSR-Timer.
1>else if a Regular ProSe BSR has been triggered and ProSeSRProhibit-Timer is not running:
2>if an UL grant is not configured:
3>a scheduling request (SR) shall be triggered.

A MAC PDU shall contain at most one ProSe BSR MAC CE, even when multiple events trigger a ProSe BSR by the time a ProSe BSR can be transmitted in which case the Regular ProSe BSR and the Periodic ProSe BSR shall have precedence over the padding ProSe BSR.

The UE shall restart RetxProseBSR-Timer upon reception of an SL grant.

All triggered ProSe BSRs shall be cancelled in case the remaining SL grant(s) valid for this SC period can accommodate all pending data available for transmission. All triggered ProSe BSRs shall be cancelled when a ProSe BSR (except for Truncated ProSe BSR) is included in a MAC PDU for transmission. All triggered ProSe BSRs shall be cancelled, and RetxProSeBSR-Timer and PeriodicProSeBSRTimer shall be stopped, when upper layers configure autonomous resource selection.

The UE shall transmit at most one Regular/Periodic ProSe BSR in a TTI. If the UE is requested to transmit multiple MAC PDUs in a TTI, it may include a padding ProSe BSR in any of the MAC PDUs which do not contain a Regular/Periodic ProSe BSR.

All ProSe BSRs transmitted in a TTI always reflect the buffer status after all MAC PDUs have been built for this TTI. Each ProSe destination shall report at the most one buffer status value per TTI and this value shall be reported in all ProSe BSRs reporting buffer status for this ProSe Destination.

A Padding ProSe BSR is not allowed to cancel a triggered Regular/Periodic ProSe BSR. A Padding ProSe BSR is triggered for a specific MAC PDU only and the trigger is cancelled when this MAC PDU has been built.

Figure 14:
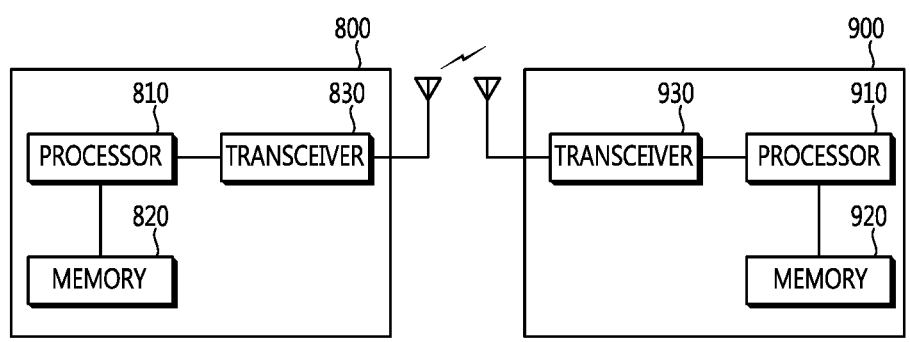
FIG. 14 shows a wireless communication system to implement an embodiment of the present invention.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for configuring, by a user equipment (UE), a proximity-based services (ProSe) scheduling request (SR) prohibit timer in a wireless communication system, wherein the ProSe SR prohibit timer is applied to logical channels on a sidelink, the method comprising:
receiving, by the UE, an indication of the ProSe SR prohibit timer from a network; and
configuring, by the UE, the ProSe SR prohibit timer according to the indication,
wherein the indication of the ProSe SR prohibit timer includes a ProSe per-packet priority (PPP) list,
wherein the ProSe SR prohibit timer is configured for at least one PPP based on the ProSe PPP list,
wherein a transmission of a SR for ProSe is prohibited by the UE while the timer is running.

2. The method of claim 1, wherein the ProSe SR prohibit timer is applied to all ProSe groups with the same ProSe group priority.

3. The method of claim 1, wherein the ProSe SR prohibit timer is configured for at least one specific quality of service (QoS) characteristic.

4. The method of claim 3, wherein the ProSe SR prohibit timer is applied to all sidelink channels with the same QoS characteristic.

5. The method of claim 1, wherein the ProSe SR prohibit timer is configured for each type of sidelink channel.

6. The method of claim 1, further comprising:
when a ProSe buffer status report (BSR) is triggered only due to data becoming available for transmission for which the ProSe SR prohibit timer is enabled, starting the ProSe SR prohibit timer for the triggered BSR.

7. The method of claim 6, further comprising:
stopping the ProSe SR prohibit timer when a ProSe BSR is not triggered only due to data becoming available for transmission for which the ProSe SR prohibit timer is enabled and while the ProSe SR prohibit timer is running,
wherein the ProSe BSR is used to provide the network with information on an amount of sidelink data available for transmission in sidelink buffers of the UE.

8. The method of claim 7, further comprising:
triggering a SR when the ProSe BSR has been triggered and the ProSe SR prohibit timer is not running.

9. The method of claim 8, further comprising:
performing a physical uplink control channel (PUCCH) transmission or a random access procedure to transmit the triggered SR.

10. The method of claim 1, wherein the indication of the ProSe SR prohibit timer is received via system information or a dedicated signaling from the network.

11. The method of claim 1, wherein the indication of the ProSe SR prohibit timer includes different configurations of the ProSe SR prohibit timers for different ProSe group priorities or for different QoS characteristics.

12. A user equipment (UE) configuring a proximity-based services (ProSe) scheduling request (SR) prohibit timer in a wireless communication system, wherein the ProSe SR prohibit timer is applied to logical channels on a sidelink, the UE comprising:
a memory;
a transceiver; and
a processor, operably coupled to the memory and the transceiver, that:
controls the transceiver to receive an indication of a proximity-based services (ProSe) scheduling request (SR) prohibit timer from a network; and
configures the ProSe SR prohibit timer according to the indication,
wherein the indication of the ProSe SR prohibit timer includes a ProSe per-packet priority (PPP) list,
wherein the ProSe SR prohibit timer is configured for at least one PPP based on the ProSe PPP list,
wherein a transmission of a SR for ProSe is prohibited while the timer is running.

* * * * *